United States Patent
Wilson et al.

(10) Patent No.: US 10,143,053 B1
(45) Date of Patent: Nov. 27, 2018

(54) METHOD AND SYSTEM FOR CONTROLLING FUNCTIONALITY OF LIGHTING DEVICES

(71) Applicant: Cooper Lighting, LLC, Cleveland, OH (US)

(72) Inventors: Brian M. Wilson, Syracuse, NY (US); Joseph R. Casper, Syracuse, NY (US); Christopher D. Nolan, Syracuse, NY (US)

(73) Assignee: Cooper Lighting, LLC, Cleveland, OH (US)

( * ) Notice: Subject to any disclaimer, the term of this patent is extended or adjusted under 35 U.S.C. 154(b) by 0 days.

(21) Appl. No.: 15/786,282

(22) Filed: Oct. 17, 2017

(51) Int. Cl.
| | |
|---|---|
| *G05B 11/01* | (2006.01) |
| *H05B 33/08* | (2006.01) |
| *H05B 37/02* | (2006.01) |
| *G05B 19/04* | (2006.01) |
| *H04L 29/08* | (2006.01) |
| *G05B 19/02* | (2006.01) |

(52) U.S. Cl.
CPC ..... *H05B 33/0845* (2013.01); *H05B 33/0863* (2013.01); *H05B 37/0272* (2013.01); *H05B 37/0281* (2013.01); *G05B 19/02* (2013.01); *G05B 19/04* (2013.01); *H04L 67/025* (2013.01)

(58) Field of Classification Search
CPC ........ G05B 19/00; G05B 19/02; G05B 19/04; H04L 67/025
USPC ............................. 700/11, 17, 20, 23, 27, 52
See application file for complete search history.

(56) References Cited

U.S. PATENT DOCUMENTS

| | | | |
|---|---|---|---|
| 8,878,451 B2* | 11/2014 | Lee | H04L 41/0806 |
| | | | 315/291 |
| 9,188,307 B2 | 11/2015 | Casper et al. | |
| 9,241,392 B2 | 1/2016 | Chemel et al. | |
| 9,367,271 B2 | 6/2016 | Zehler et al. | |
| 9,730,298 B2* | 8/2017 | Vangeel | F24F 11/30 |
| 9,730,302 B2 | 8/2017 | Vollmer et al. | |
| 2013/0271001 A1* | 10/2013 | Kurachi | H05B 33/0815 |
| | | | 315/53 |
| 2013/0271004 A1 | 10/2013 | Min et al. | |
| 2017/0034247 A1 | 2/2017 | Tredoux | |
| 2017/0086279 A1 | 3/2017 | Chemel et al. | |
| 2017/0171950 A1* | 6/2017 | Barna | H05B 37/0272 |
| 2017/0264452 A1 | 9/2017 | Vollmer et al. | |

(Continued)

*Primary Examiner* — Thuy Vinh Tran
(74) *Attorney, Agent, or Firm* — Fox Rothschild LLP

(57) ABSTRACT

A lighting device control system includes a lighting device that includes a communication interface, an optical radiation source, and a fixture controller. The system also may include a gateway controller that is in communication with the lighting device and one or more other lighting devices. The fixture controller or gateway controller identifies that a portable electronic device is in a proximate communication range. The fixture or gateway controller also receives a light operation request from the portable electronic device. The light operation request includes one or more settings for one or more optical characteristics of light that the optical radiation source may emit. The fixture controller determines whether the portable electronic device is authorized to implement the request. In response to determining that the device is authorized, the fixture controller will cause the optical radiation source to emit light that exhibits the optical characteristic(s).

21 Claims, 7 Drawing Sheets

(56) References Cited

U.S. PATENT DOCUMENTS

2017/0311418 A1* 10/2017 Vangeel .................. G06F 8/654
2018/0077778 A1* 3/2018 Vangeel ............. H05B 37/0245

* cited by examiner

METHOD AND SYSTEM FOR CONTROLLING FUNCTIONALITY OF LIGHTING DEVICES

BACKGROUND

Modern lighting systems include many features that were not previously available to facility operators and users. For example, lighting systems that include light emitting diode (LED) luminaires or other types of luminaires may offer features such as: controllable dimming; color selection and color tuning; adjustment of other characteristics of emitted light such as color temperature or $D_{uv}$, control of the shape and/or direction of emitted light beams; and pre-programmed scenes or customized scenes that incorporate a set of pre-programmed features.

In facilities such as theaters, concert venues, sports fields and stadiums, and even in commercial buildings, the lighting needs can change frequently depending on who is using the facility at any given time. For example, a venue may be used for a convention or business meeting during the day and a concert or social event in the evening. A sports field may be used for a football or soccer game at one time of day and a lacrosse team practice at another time of day. However, lighting systems do not easily adapt to the needs of each user and event. Instead, lighting systems are typically set in a "fully on" or "fully off" arrangement unless the facility is staffed with technicians who can manually change the lighting system scenarios in response to new users' needs.

This disclosure describes methods and systems for controlling the functionality of a network of one or more lighting devices.

SUMMARY

A lighting device control system controls one or more lighting devices. The system may include a first lighting device that includes a communication interface, an optical radiation source, and a fixture controller comprising a processor and memory device. The memory device contains programming instructions configured to cause the first lighting device (or a gateway controller, as noted below) to receive, via the communication interface, a signal indicating that a portable electronic device is in a proximate communication range of the communication interface. The instructions are also configured to cause the first lighting device or gateway controller to receive, via the communication interface, a light operation request from the portable electronic device. The light operation request will include one or more settings for one or more optical characteristics of light that the optical radiation source may emit. The fixture controller or gateway controller will determine whether the portable electronic device is authorized to initiate the light operation request. In response to determining that the portable electronic device is authorized to initiate the light operation request, the fixture controller or gateway controller will cause the optical radiation source to emit light that exhibits the one or more optical characteristics.

Optionally, the light operation request may include a time, such as a numeric time or a duration. If so, then the instructions to cause the optical radiation source to emit light may cause the fixture controller to initiate or maintain the optical radiation source in an on condition or a requested condition for a first time period, and then switch the optical radiation source to an off condition or a default condition when the first time period expires. If the lighting device receives, via the communication interface before the time has expired, a request to extend the first time period to an extended time, the fixture controller will determine whether the portable electronic device is authorized to extend the first time period to the extended time, and if the portable electronic device is authorized the fixture controller will cause the optical radiation source to continue to emit light that exhibits the one or more optical characteristics through the extended time.

In various embodiments, the optical characteristics of the emitted light that the system controls may include any or all of the following: a brightness or dimming level; color temperature; color; $D_{uv}$; beam shape; or beam direction. In addition, the optical characteristics may be included in a scene in which settings for one or more optical characteristics of the emitted light change over time. If a scene is used, then the system may initiate or maintain the optical radiation source in an on condition and then cause the settings for the one or more optical characteristics of the emitted light to change over time according to the scene.

Optionally, the system also may include a gateway controller that is communicatively connected to the fixture controller of the first lighting device and one or more additional lighting devices. If so, then the signal indicating that the portable electronic device is in a proximate communication range of the communication interface may comprise a signal received from the fixture controller. The gateway controller will include a processor, communication interface, and memory containing programming instructions.

Optionally, the communication interface may include a short-range or near-field antenna. If so, then the signal indicating that the portable electronic device is in a proximate communication range of the communication interface of the lighting device or the gateway controller may comprise a signal that is directly received from a short-range or near field transmitter of the portable electronic device. In addition or alternatively, the communication interface may include an antenna that is communicatively connected to a wireless local area network. If so, then the signal indicating that the portable electronic device is in a proximate communication range of the communication interface may comprise a signal indicating that the portable electronic device is connected to the wireless local area network.

In various embodiments, the system may include a second lighting device that also has a communication interface, an optical radiation source and a fixture controller, and wherein. The light operation request also may include one or more settings for one or more optical characteristics of light that the second lighting device may emit. If so, then in response to determining that the portable electronic device is authorized to submit the light operation request, the fixture controller or gateway controller may transmit one or more settings from the light operation request to the second lighting device for the fixture controller of the second lighting device to use in operation of its optical radiation source. The settings for the second lighting device may be the same as, or different from, for the first lighting device.

Optionally, to determine whether the portable electronic device is authorized to initiate the light operation request, the portable device, fixture controller or gateway controller may transmit an account identifier associated with the portable electronic device and data from the light operation request to a remote server. The device or controller may then receive, from the remote server, a confirmation that the portable electronic device is authorized to initiate the light operation request.

Optionally, to determine whether the portable electronic device is authorized to initiate the light operation request, the fixture controller or gateway controller may determine whether the light operation request includes a valid unlock token.

Optionally, the system may further include the portable electronic device, which comprises a processor, a user interface, and a memory device containing programming instructions for a lighting system control application. The control application is configured to cause the processor of the portable electronic device to cause the user interface to output candidate optical characteristics for the optical radiation source and, for at least some of the candidate optical characteristics, a user-selectable setting. The control application will cause the portable electronic device to receive, via the user interface, a selection of at least one of the candidate optical characteristics and an associated setting for each selected optical characteristics. The control application will generate the light operation request as data comprising each of the one or more selected optical characteristics and its associated setting and an account identifier. The portable electronic device will then transmit the light operation request to the first lighting device.

In addition, the user interface may output indicia of whether an account associated with the portable electronic device has unlocked an ability to adjust the user-selectable setting. The portable electronic device may receive, via the user interface, a request to unlock a user-selectable setting for which the ability to adjust is locked. If so, the portable electronic device may transmit a command to charge the account an amount that is assigned to the user-selectable setting. Upon receipt of verification that the account has been charged the amount, the portable electronic device may unlock the ability to adjust the user-selectable setting. The portable electronic device may receive, via the user interface, a value for the user-selectable setting. The portable electronic device will the generate the light operation request to include the value for the user-selectable setting, and it will transmit the light operation request to the first lighting device.

DETAILED DESCRIPTION

Figure 1:
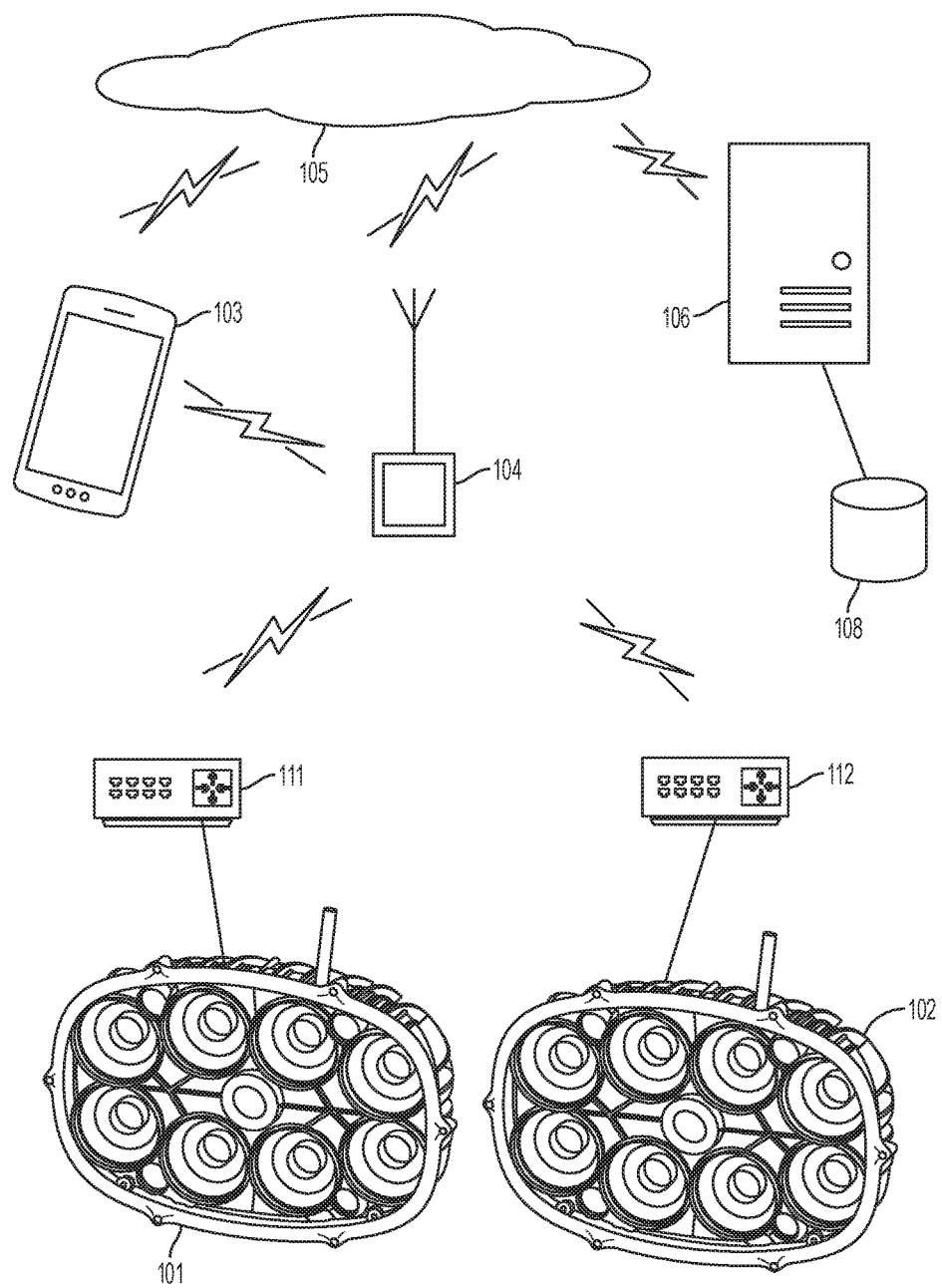
FIG. 1 illustrates an example of a network of lighting devices, with a proximate mobile electronic device and remote server that are used to control the light emitted by the network of devices.

As used in this document, the singular forms "a," "an," and "the" include plural references unless the context clearly dictates otherwise. Unless defined otherwise, all technical and scientific terms used herein have the same meanings as commonly understood by one of ordinary skill in the art. In this document, when terms such "first" and "second" are used to modify a noun, such use is simply intended to distinguish one item from another, and is not intended to require a sequential order unless specifically stated. As used in this document, the term "comprising" (or "comprises") means "including (or includes), but not limited to."

In this document, the terms "lighting device," "light fixture," "luminaire" and "illumination device" are used interchangeably to refer to a device that includes a source of optical radiation. Sources of optical radiation may include, for example, light emitting diodes (LEDs), light bulbs, ultraviolet light or infrared sources, or other sources of optical radiation. In the embodiments disclosed in this document, the optical radiation emitted by the lighting devices includes visible light. A lighting device will also include a housing, one or more electrical components for conveying power from a power supply to the device's optical radiation source, and optionally control circuitry.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

A "communication interface" of a lighting device or other electronic device is a hardware element configured to enable the device to transmit and/or receive data signals from proximate devices and/or a communication network. Communication interfaces for communicating with proximate devices may include, for example, a short range wireless communication interface such as a transmitter, a near field communication (NFC) or radio frequency identifier (RFID) tag, or a Bluetooth™ or Bluetooth™ Low Energy (BLE) transceiver. Communication interfaces for indirectly communicating with proximate or non-proximate devices via one or more communication networks may include, for example, a wireless network card with wireless network antenna, a data port, or the like.

In this document, the terms "controller" and "controller device" mean an electronic device or system of devices configured to command or otherwise manage the operation of one or more other devices. For example, a fixture controller is a controller configured to manage the operation of one or more light fixtures to which the fixture controller is communicatively linked. A controller will typically include a processing device, and it will also include or have access to a memory device that contains programming instructions configured to cause the controller's processor to manage operation of the connected device or devices.

In this document, the terms "memory" and "memory device" each refer to a non-transitory device on which computer-readable data, programming instructions or both are stored. Except where specifically stated otherwise, the terms "memory" and "memory device" are intended to include single-device embodiments, embodiments in which multiple memory devices together or collectively store a set of data or instructions, as well as one or more individual sectors within such devices.

In this document, the terms "processor" and "processing device" refer to a hardware component of an electronic device (such as a controller) that is configured to execute programming instructions. Except where specifically stated otherwise, the singular term "processor" or "processing device" is intended to include both single processing device embodiments and embodiments in which multiple processing devices together or collectively perform a process.

A "computing device" or "electronic device" refers to an electronic device having a processor, a memory device, and a communication interface for communicating with proximate and/or local devices. The memory will contain or receive programming instructions that, when executed by the processor, will cause the electronic device to perform one or more operations according to the programming instructions. Examples of electronic devices include personal computers, servers, mainframes, virtual machines, containers, gaming systems, televisions, and portable electronic devices such as smartphones, wearable virtual reality devices, Internet-connected wearables such as smart watches and smart eyewear, personal digital assistants, tablet computers, laptop computers, media players and the like. Electronic devices also may include appliances and other devices that can communicate in an Internet-of-things arrangement, such as smart thermostats, home controller devices, voice-activated digital home assistants, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 7.

FIG. 1 illustrates a lighting device control system in which any number of lighting devices 101, 102 are positioned at various locations in an environment, such as a wall, ceiling, mast, tower or other supporting structure in a stadium, arena, concert hall, outdoor amphitheater, park or other sports or entertainment facility, or a commercial building or other light-enabled facility. Optionally, a group of lighting devices at the facility may be controlled by a gateway controller 104 communicatively coupled to one or more fixture controllers 111, 112 that are connected to one or more lighting devices 101, 102. If a gateway controller 104 is used, it may be configured to pair with a portable electronic device 103, receive a light operation request from the portable electronic device 103 and control at least one lighting device 101, 102 via the fixture controller 111, 112 according to the light operation request. Alternatively or in addition, the portable electronic device may send control commands directly to a lighting device's fixture controller 111, 112. Each fixture controllers 111, 112 includes various components of an illumination device's control circuitry.

Each fixture controller, the gateway controller 104 and/or the portable electronic device 103 may be capable of communicating with a communication network 105, such as a cellular communication work, an Internet, a mesh network or other wired or wireless communication networks. A remote server 106 also may be communicatively connected to the communication network 105 so that it can communicate with the portable electronic device, gateway controller 104, and/or fixture controllers 111, 112. The remote server 106 may include or be connected one or more memory devices that collectively store a database 108 of data for the light-enabled facility, such as scheduling data, data about available lighting devices and optional functions, available scenes, costs of various services and other data. The portable electronic device 103 may include a memory device containing programming instructions that are configured to cause the portable electronic device to perform various functions. In addition or alternatively, the portable electronic device 103 may access the remote server 106 via a communication network 105 to obtain program instructions that are stored on and/or executed by the server.

Figure 2:
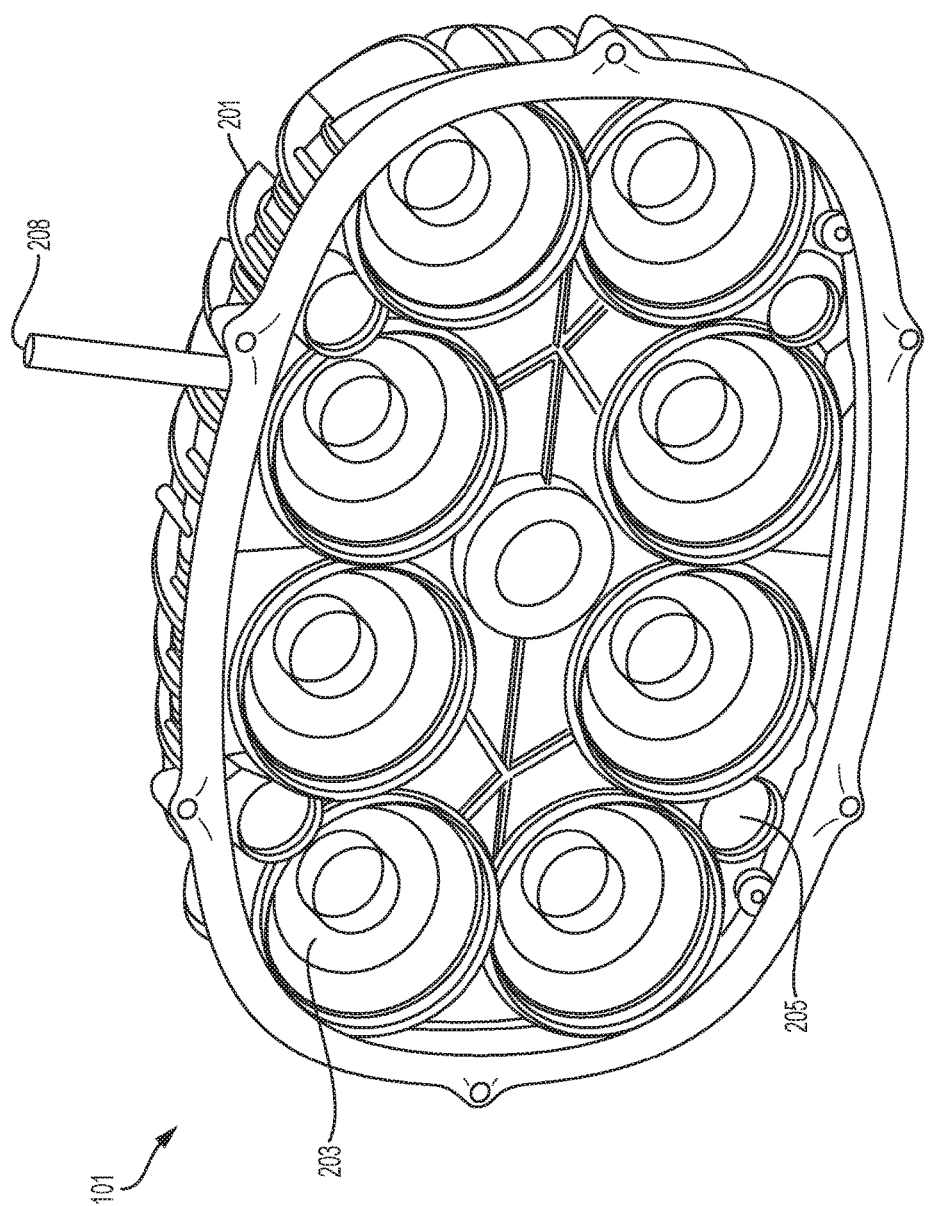
FIG. 2 illustrates an example of a lighting device that may be used with a network of lighting devices.

Referring to FIG. 2, an example lighting device 101 will include an optical radiation source, such as any number of lighting modules that include LEDs, and in various embodiments a number of LED modules sufficient to provide a high intensity LED device. In various embodiments, a lighting device may include multiple types of LED modules. For example, a lighting device may include a first type of LED module 203 having LEDs that are configured to selectably emit white light of various color temperatures, along with a second type of LED module 205 having LEDs that are configured to selectably emit light of various colors. The lighting device 101 may include a housing 201 that holds electrical components such as a fixture controller, a power source, and wiring and circuitry to supply power and/or control signals to the LED modules.

Figure 3:
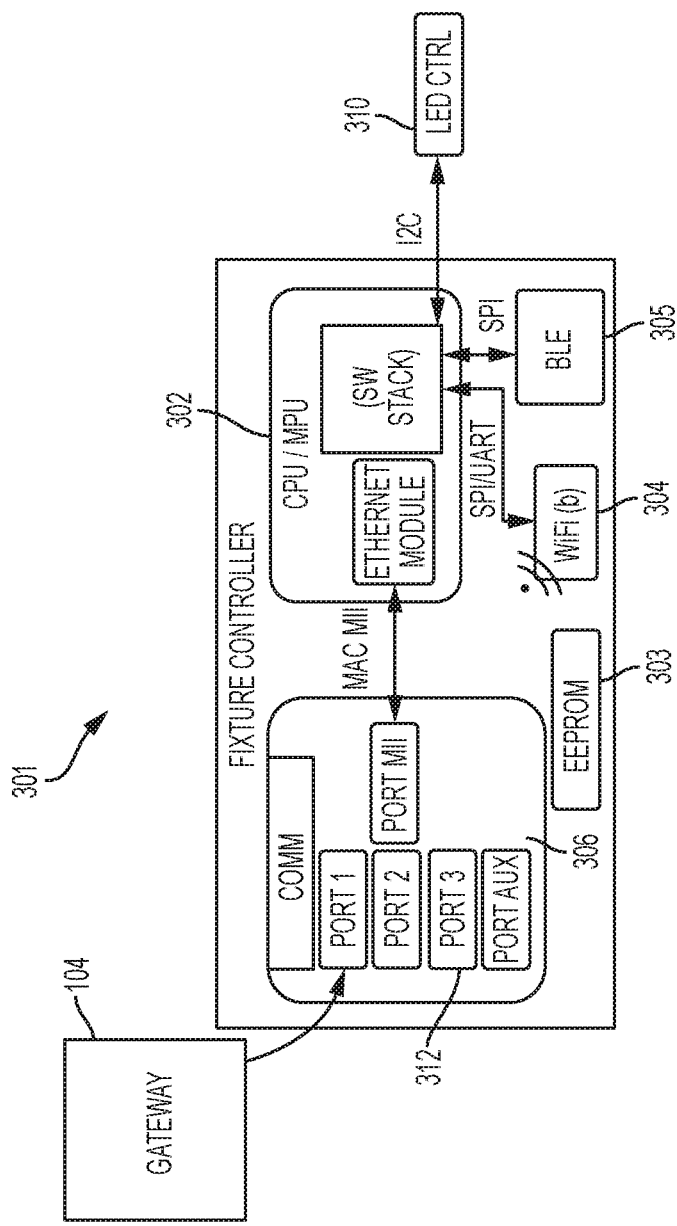
FIG. 3 illustrates example components of a fixture controller of a lighting device.

A fixture controller may be an external device or an integral device that includes various components of an illumination device's control circuitry. Example components of a fixture controller 301 are shown in FIG. 3. A fixture controller 301 will include a processor 302 and memory device 303 containing programming and/or data that the processor 302 uses to selectively control the LED modules 310 or other optical radiation source of the lighting device. The fixture controller 301 will include any number of communication interfaces, such as a Wi-Fi antenna 304, a short-range communication or NFC transceiver 305, and/ or a wired communication interface 306 containing any number of ports 312 via which other lighting devices, controllers or other devices may be connected to the fixture controller's lighting device. For example, a gateway controller 104 may be connected to the fixture controller 301 via any of the ports 312.

In this document the term "gateway controller" refers to a central controller device that receives commands from a remote electronic device and routes the commands to appropriate lighting device fixture controllers in a network of lighting devices. The gateway controller may include a processor and a communications interface that includes a router or switch with one or more Ethernet ports or optical fiber connectors configured to receive an Ethernet and/or fiber-optic cable. Other types of cables and connectors may be used, but for purposes of this disclosure Ethernet and fiber-optic cables and connectors will be used as examples. This document may use the term "lighting device controller" to refer to a component when the component may be either a gateway controller or a fixture controller.

Referring back to FIG. 1, a lighting device 101 may communicate with a proximate portable electronic device 103 via a direct or indirect communication link. The lighting device 101 also may communicate with any number of proximate additional lighting devices 102 via a direct or indirect communication link. Each of the lighting devices 101, 102, as well as the proximate portable electronic device 103, may communicate with a remote server 106 by any number of communication links. The remote server 106 may be a cloud-based server that communicates with the other devices via a communication network 105.

Figure 4:
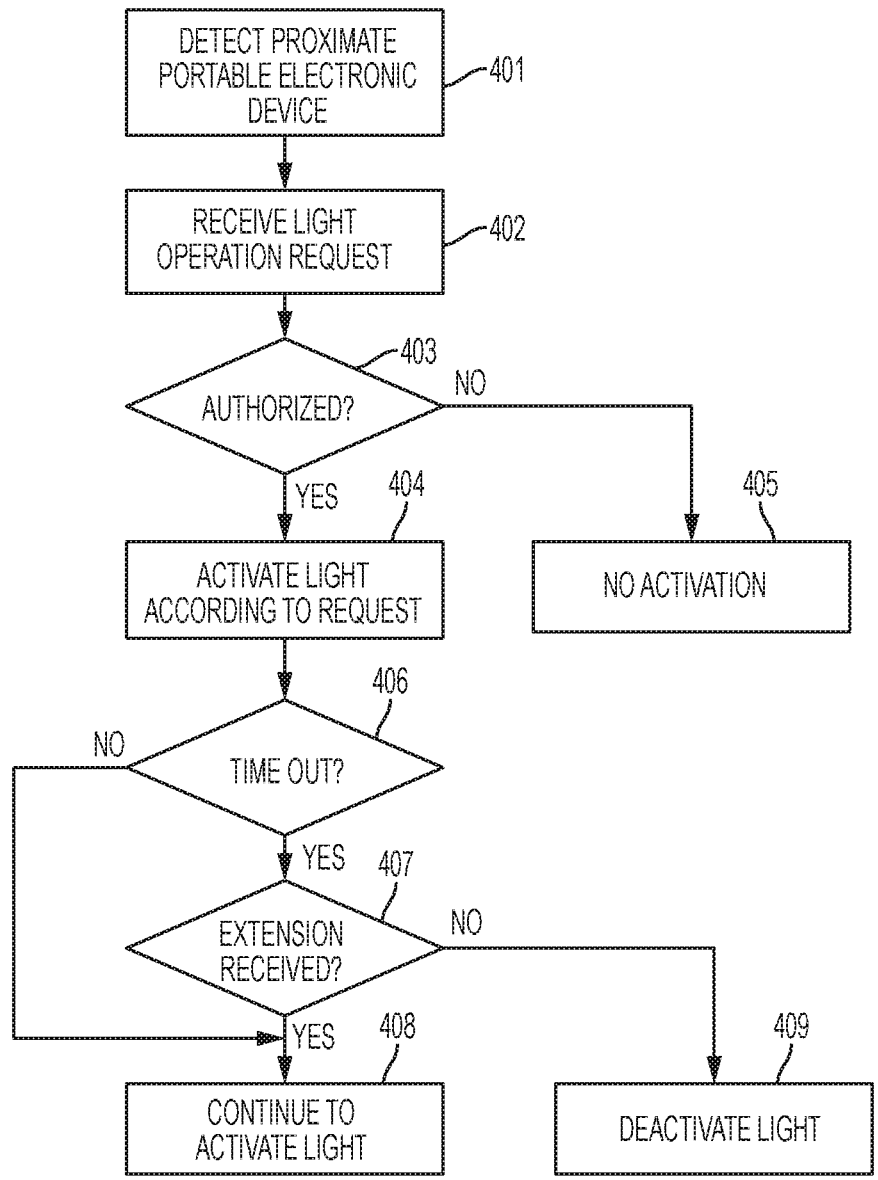
FIG. 4 illustrates an example lighting device control process.

FIG. 4 is a flow diagram illustrating a method of controlling one or more lighting devices in a system such as that disclosed above. A lighting device's fixture controller, or a gateway controller if used, will detect 401 that a portable electronic device on which a lighting control application is installed is proximate to the lighting device or gateway controller. Devices are "proximate" to each other if they are within a communication range of each other on a local area network or using a short-range communication or NFC communication protocol.

Short-range communication transceivers are devices that directly communicate with each other via relatively short distances on the order of 100 meters or less, or 10 meters or less. Examples of short-range transceivers include those that adhere to short-range communication protocols such as ZigBee®, Bluetooth®, and Bluetooth® Low Energy (BLE) transceivers, and/or via infrared (IR) light transceivers. NFC transceivers are ultra-short range transceivers that adhere to one or more standards for radio frequency communications that may be used when two devices are in close proximity, and may include hardware elements such as loop antennas that exchange information via electromagnetic induction. Protocols for implementation of NFC may comply with industry standards such as ISO/IEC 18092 or ISO/IEC 18000-3, published by the International Standards Organization. Typical ranges for near field communications are approximately 10 cm or less, although it may be 20 cm or less, 4 cm or less, or other ranges. By receiving a connection request via a short-range communication protocol or NFC protocol, the lighting device or gateway controller will thus detect that the mobile electronic device is proximate to the lighting device.

This detection 401 may occur, for example, by receiving a connection request from the portable electronic device via a short-range communication or NFC transceiver. Alternatively, the detection 401 may occur by receiving a connection request from the portable device via a known wireless local area network (WLAN), such as a Wi-Fi network that has a limited range and to which the lighting device is also communicatively connected. By receiving a connection request from a mobile electronic device that is communicatively connected to the same WLAN to which the lighting device controller is connected, the lighting device controller will thus detect that the mobile electronic device is proximate to the lighting device controller.

The lighting device controller will also receive, via the communication interface, a light operation request 402 from the portable electronic device. The light operation request will be one or more data packets that include one or more settings for one or more optical characteristics of light that the optical radiation source of the lighting device or devices that are associated with the lighting device controller and/or other communicatively connected lighting devices may emit. The one or more optical characteristics comprise may include settings such as a brightness or dimming level, color temperature, color, $D_{uv}$, beam shape, and/or beam direction of the light emitted by the optical radiation source. The lighting device controller may determine whether the portable electronic device is authorized to cause the lighting device(s) to implement the light operation request 403. If the lighting device controller determines that the portable electronic device is authorized to initiate the light operation request, it will cause the optical radiation source(s) to emit light that exhibits the one or more optical characteristics of the light operation request 404. If the lighting device controller determines that the portable electronic device is not authorized to initiate the light operation request, it will not implement the request and thus not activate the optical radiation source(s) according to the request 405.

To determine whether the portable electronic device is authorized to cause the lighting device controller to implement the light operation request 403, the lighting device controller may determine whether the portable electronic device is associated with a valid unlock token for the light operation request. A valid unlock token is a digital identifier that the lighting device knows represents authorization to activate or change one or more characteristics of emitted light, such as a code or authentication token. The lighting device controller may receive the unlock token from the portable electronic device with the light operation request and compare the token with a set of locally or remotely stored authentication tokens to determine whether the received token matches a known valid token or adheres to a valid token standard. Alternatively, the lighting device controller may receive an account identifier for the portable electronic device, transmit the account identifier to a remote server so that the remote server can perform the authentication, and receive the unlock token from the remote server of the remote server determines that the portable electronic device is authorized to unlock the requested feature of the lighting device.

To obtain an unlock token, the user interface may output indicia of whether an account associated with the portable electronic device has unlocked an ability to adjust the user-selectable setting. The portable electronic device may receive, via the user interface, a request to unlock a user-selectable setting for which the ability to adjust is locked. If so, the portable electronic device may transmit a command to charge the account an amount that is assigned to the user-selectable setting. Upon receipt of verification that the account has been charged the amount, the portable electronic device may unlock the ability to adjust the user-selectable setting and generate or receive the unlock token.

To cause a lighting device's associated optical radiation source to emit light that exhibits the optical characteristics values of the light operation request 404, the fixture controller of that lighting device will implement one or more commands to control operation of the optical radiation source. Example methods for altering optical characteristics of LED lights are disclosed in, for example: (i) U.S. Pat. No. 9,188,307 to Casper et al., titled "High Intensity LED Illumination Device with Automated Sensor-Based Control"; (ii) U.S. Pat. No. 9,189,996 to Casper et al., titled "Selectable, Zone-Based Control for High Intensity LED Illumination System"; (iii) U.S. patent application Ser. No. 15/670,659, filed by Nolan et al. and titled "Lighting Device LED Module with Effects for Color Temperature Tuning and Color Tuning"; and (iv) U.S. patent application Ser. No. 15/670,671, filed by Nolan et al. and titled "Lighting Device LED Module with Effects for Beam Spread Tuning and Beam Shaping." The disclosures of each of these patents and patent applications are fully incorporated into this document by reference. The optical characteristics may include a scene, which is a set of data corresponding to various optical characteristics of the emitted light for which the setting values will change over time. If so, then the fixture controller may cause the values of those optical characteristics of the emitted light to change over time according to the scene.

Optionally, the light operation request may include a time. The time is a data point indicative of a numeric start time, stop time and/or or a duration for activation of one or more characteristics of the optical radiation source. If so, then when causing the optical radiation source to emit light according to the requested characteristics the fixture controller will initiate or maintain the optical radiation source in an on condition according to the selected characteristics at a first time, and then when a time out condition occurs 406 corresponding to expiration (i.e., the off time or the end of the duration), the fixture controller will deactivate the optical radiation source and/or the selected characteristics when the time expires 409. Deactivation may include completely turning the light off, or returning the light to a default setting that does not include all of the selected characteristic values of the light operation request. Optionally, the system may receive an extension request 407 from the mobile electronic device before the time expires. The extension request will include a new (and later) stop time or an extension to the duration. If the fixture controller determines that the mobile electronic device is authorized to extend the time of operation according to the extension request (using authorization procedures such as those described above), the fixture controller will continue to activate the optical radiation source 408 with the requested characteristic values until the extended time expires, at which time the fixture controller will deactivate the light as described above.

Optionally, a light operation request may include a request to operate not only the lighting device that includes or is associated with the lighting device controller receives the request, but also one or more other lighting devices in a system that is communicatively connected to the lighting device controller that receives the request. For example, the light operation request may include one or more settings for one or more optical characteristics of light that a second lighting device may emit. To do this, the lighting operation request may include an identifier for the second lighting device, such as an address of the second lighting device, or it may include a general command such as "apply the light operation request to all connected lighting devices." If so, the lighting device controller may determine whether the portable electronic device is also authorized to initiate the light operation request for the second lighting device, and if so the lighting device controller will transmit one or more settings from the light operation request to the second lighting device for a fixture controller of the second lighting device to use in operation of its optical radiation source. This transmission may occur via a wired or wireless communication link. The requested optical characteristics for the second lighting device may be the same as or different from those requested for the first lighting device.

Figure 5:
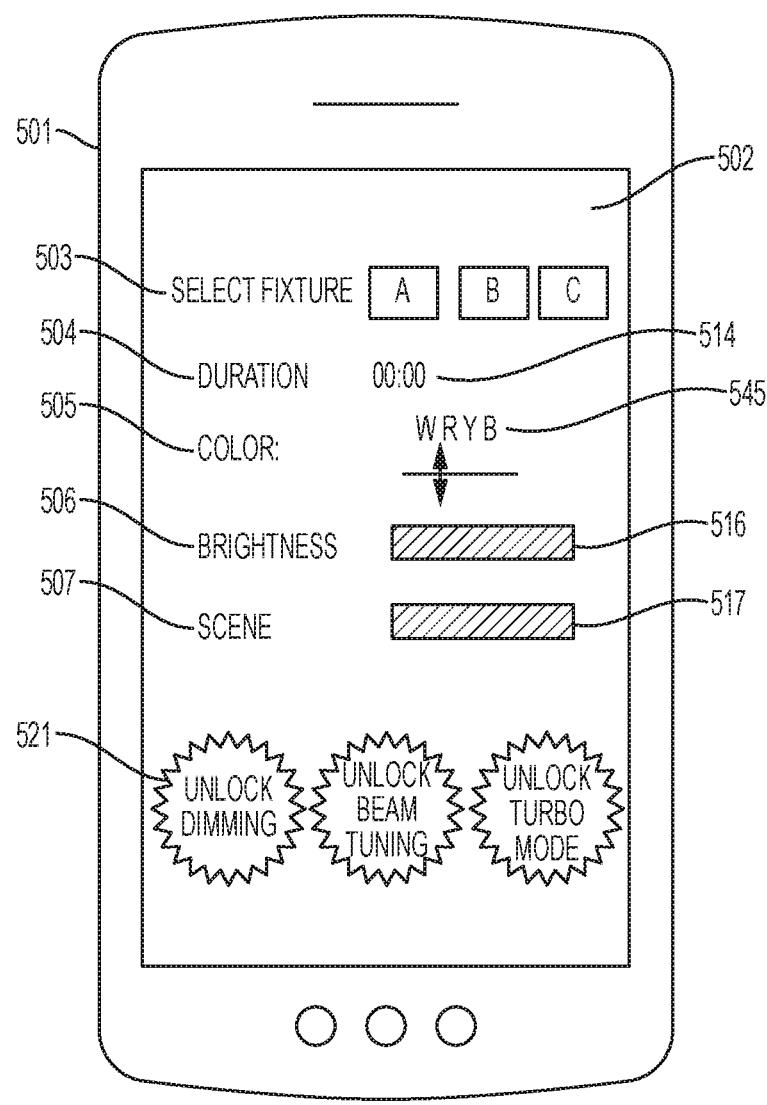
FIG. 5 illustrates an example of a portable electronic device user interface that may be used to control the light emitted by one or more proximate lighting devices.

FIG. 5 illustrates an example portable electronic device 501 with user interface 502. In the example of FIG. 5, the user interface 502 is a touch-sensitive display device. In other embodiments, instead of or in addition to the display the user interface may include other user input/output hardware such as a microphone and/or audio speaker, a keyboard or keypad, or another user interface device. The user interface 502 may include a fixture selector 503 via which the user may select one or more lighting devices to control, and a time selector 504 via which a user may enter a time 514 such as a start time, stop time or duration. The user interface 502 also may include any number of lighting characteristics selectors 505, 506 via which the user may enter values for one or more user-selectable settings for characteristics of the light to be emitted by the selected lighting device(s). The system may display various candidate user-selectable settings 516, 517, 545, such as a data entry field, a list of options or another selector, for characteristics that the user is authorized to select. For any settings that are locked for the user's account (i.e., not yet unlocked because the user is not yet authorized to implement the settings), the user-selectable settings 516 may be displayed in a non-selectable format, such as a shield or overlay, or in a greyscale or other format that is not actuatable by the user until the user unlocks the setting. The user interface also may include an actuator 521 via which the user may unlock the setting, such as a purchasing interface by which a user may purchasing access to the relevant feature.

Optionally, the user interface may include a scene selector 507 via which the user may select a scene that includes a set of one or more characteristics for one or more lights, in which the setting value for at least some of the characteristic(s) will change over time. The available values 517 may include pre-defined scenes, or the system may provide a scene creator user interface via which the user may select the settings, lighting devices and times that will define a new scene or adjust a pre-defined scene.

Figure 6:
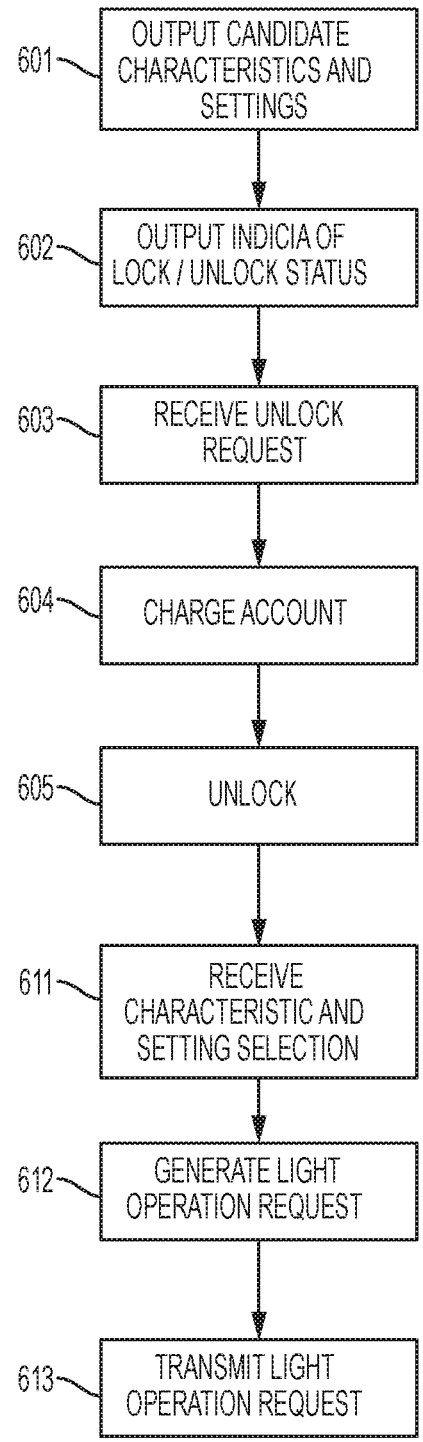
FIG. 6 illustrates example steps that a portable electronic device may take when being used to control a lighting device.

FIG. 6 illustrates a process that a portable electronic device may follow to initiate a light operation request for one or more proximate lighting devices. The portable electronic device will include a user interface that outputs various candidate optical characteristics for the optical radiation source 601. For at least some of the candidate optical characteristics, the user interface will also display user-selectable settings. As discussed above in FIG. 5, the system also may output lock/unlock status indicia 602 of whether an account associated with portable device or its user has unlocked the ability to select settings for each characteristic. For example, for characteristics that are not locked, user-selectable settings may be presented in a user-selectable format, such as a data entry field, list, or other structure. Characteristics for which user-selectable settings that are locked will not be displayed in a user-selectable format, and may be displayed in grayscale, in shielded format, or with other indicia showing that they are locked, or they may not be displayed at all.

For any characteristic that is locked, the user may input (and the portable electronic device may receive via the user interface) an unlock request 603. If so, the system may generate and transmit a command to charge a user's account an amount required to unlock the setting 604. Upon receiving confirmation from the remote server that the account has been charged, the device may unlock 605 the characteristic so that the user can select the value of that characteristic's setting.

When the portable electronic device receives, via the user interface, a selection of at least one of the candidate optical characteristics and a value for an associated setting for each selected optical characteristic 611, it will generate a or otherwise identify light operation request 612 as data comprising each of the one or more selected optical characteristics and its associated setting's value and an account identifier. The portable electronic device will then transmit 613 the light operation request to the first lighting device via an NFC or short range communication protocol.

Figure 7:
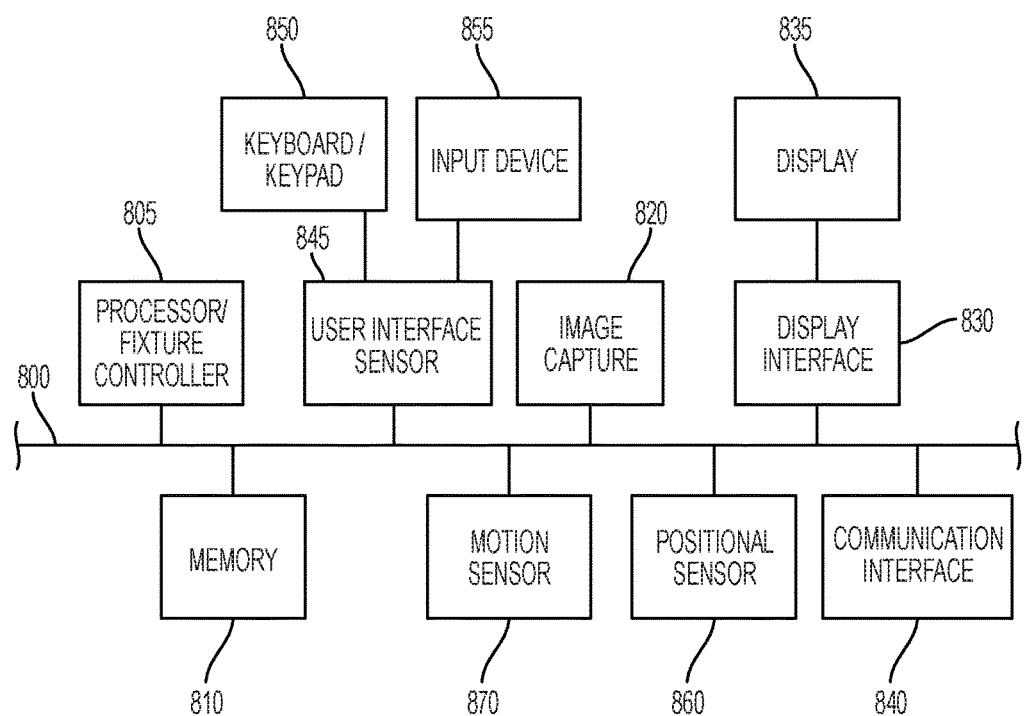
FIG. 7 illustrates various hardware components that may be included in one or more electronic devices.

FIG. 7 is a block diagram of hardware that may be including in any of the electronic devices described above, such as a lighting device, electronic device or controller device. A bus 800 serves as an information highway interconnecting the other illustrated components of the hardware. The bus may be a physical connection between elements of the system, or a wired or wireless communication system via which various elements of the system share data. Processor 805 is a processing device of the system performing calculations and logic operations required to execute a program. Processor 805, alone or in conjunction with one or more of the other elements disclosed in FIG. 7, is an example of a processing device, computing device or processor as such terms are used within this disclosure. The processing device may be a physical processing device, a virtual device contained within another processing device, or a container included within a processing device. If the electronic device is a lighting device, processor 805 may be a component of a fixture controller if the electronic device is a lighting device, and the device would also include a power supply and optical radiation source as discussed above.

A memory device 810 is a hardware element or segment of a hardware element on which programming instructions, data, or both may be stored. An optional display interface 830 may permit information to be displayed on the display 835 in audio, visual, graphic or alphanumeric format. Communication with external devices, such as a printing device, may occur using various communication interfaces 840, such as a communication port, antenna, or near-field or short-range transceiver. A communication interface 840 may be communicatively connected to a communication network, such as the Internet or an intranet.

The hardware may also include a user input interface 845 which allows for receipt of data from input devices such as a keyboard or keypad 850, or other input device 855 such as a mouse, a touchpad, a touch screen, a remote control, a pointing device, a video input device and/or a microphone. Data also may be received from an image capturing device 820 such as a digital camera or video camera. A positional sensor 860 and/or motion sensor 870 may be included to detect position and movement of the device. Examples of motion sensors 870 include gyroscopes or accelerometers. Examples of positional sensors 860 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A lighting device control system for controlling one or more lighting devices, the system comprising:
 a first lighting device comprising:
  a communication interface;
  an optical radiation source; and
  a fixture controller comprising a processor and memory device, wherein the memory device contains programming instructions configured to cause the first lighting device to:
   receive, via the communication interface, a signal indicating that a portable electronic device is in a proximate communication range of the communication interface,
   receive, via the communication interface, a light operation request from the portable electronic device, wherein the light operation request comprises one or more settings for one or more optical characteristics of light that the optical radiation source may emit,
   determine whether the portable electronic device is authorized to cause the optical radiation source to implement the light operation request, and
   in response to determining that the portable electronic device is authorized to submit the light operation request, cause the optical radiation source to emit light that exhibits the one or more settings for the one or more optical characteristics.

2. The lighting device control system of claim 1, wherein:
 the light operation request also comprises a time, wherein the time comprises a numeric time or a duration; and
 the instructions to cause the optical radiation source to emit light comprise instructions to initiate or maintain the optical radiation source in an on condition or a requested condition for a first time period, and then switch the optical radiation source to an off condition or a default condition when the first time period expires.

3. The lighting device control system of claim 2, further comprising additional programming instructions configured to:
 receive, via the communication interface before the first time period has expired, a request to extend the first time period to an extended time;
 determine whether the portable electronic device is authorized to extend the first time period to the extended time; and
 in response to determining that the portable electronic device is authorized to extend the first time period to the extended time, cause the optical radiation source to continue to emit light that exhibits the one or more settings for the one or more optical characteristics through the extended time.

4. The lighting device control system of claim 1, wherein the one or more optical characteristics comprise:
 a brightness or dimming level;
 color temperature;
 color;
 $D_{uv}$;
 beam shape; or
 beam direction.

5. The lighting device control system of claim 1, wherein:
 the one or more optical characteristics comprise a scene in which settings for one or more optical characteristics of the emitted light change over time; and
 the instructions to cause the optical radiation source to emit light comprise instructions to initiate or maintain the optical radiation source in an on condition and then cause the settings for the one or more optical characteristics of the emitted light to change over time according to the scene.

6. The lighting device control system of claim 1, wherein:
 the communication interface comprises a short-range or near-field antenna; and
 the signal indicating that the portable electronic device is in a proximate communication range of the communication interface comprises a signal that is directly received from a short-range or near field transmitter of the portable electronic device.

7. The lighting device control system of claim 1, wherein:
 the communication interface comprises an antenna that is communicatively connected to a wireless local area network; and
 the signal indicating that the portable electronic device is in a proximate communication range of the communication interface comprises a signal indicating that the portable electronic device is connected to the wireless local area network.

8. The lighting device control system of claim 1:
 further comprising a gateway controller that is communicatively connected to the fixture controller; and
 wherein the signal indicating that the portable electronic device is in a proximate communication range of the communication interface comprises a signal received from the fixture controller.

9. The lighting device control system of claim 1, further comprising a second lighting device that also has a communication interface, an optical radiation source and a fixture controller, and wherein:

the light operation request also comprises one or more settings for one or more optical characteristics of light that the second lighting device may emit; and the programming instructions also comprise instructions to, in response to determining that the portable electronic device is authorized to submit the light operation request, transmit one or more settings from the light operation request to the second lighting device for the fixture controller of the second lighting device to use in operation of its optical radiation source.

10. The lighting device control system of claim 9, wherein the one or more settings for the second lighting device are different from the one or more settings for the first lighting device.

11. The lighting device control system of claim 1, wherein the instructions to determine whether the portable electronic device is authorized to initiate the light operation request comprise instructions to:

transmit an account identifier associated with the portable electronic device and data from the light operation request to a remote server; and receive, from the remote server, a confirmation that the portable electronic device is authorized to submit the light operation request.

12. The lighting device control system of claim 1, wherein the instructions to determine whether the portable electronic device is authorized to initiate the light operation request comprise instructions to determine whether the light operation request includes a valid unlock token.

13. The lighting device control system of claim 1, further comprising the portable electronic device, wherein the portable electronic device comprises:

a processor;
a user interface; and
a memory device containing programming instructions for a lighting system control application that is configured to cause the processor of the portable electronic device to:

cause the user interface to output a plurality of candidate optical characteristics for the optical radiation source and, for at least some of the candidate optical characteristics, a user-selectable setting;

receive, via the user interface, a selection of at least one of the candidate optical characteristics and an associated setting for each selected optical characteristics;

generate the light operation request as data comprising each of the one or more selected optical characteristics and its associated setting and an account identifier; and transmit the light operation request to the first lighting device.

14. The lighting device control system of claim 1, further comprising the portable electronic device, wherein the portable electronic device comprises:

a processor;
a user interface; and
a memory device containing programming instructions for a lighting system control application that is configured to cause the processor of the portable electronic device to:

cause the user interface to output a plurality of candidate optical characteristics for the optical radiation source and, for each of the candidate optical characteristics:

a user-selectable setting, and indicia of whether an account associated with the portable electronic device has unlocked an ability to adjust the user-selectable setting;

receive, via the user interface, a request to unlock a user-selectable setting for which the ability to adjust is locked;

transmit a command to charge the account an amount that is assigned to the user-selectable setting;

upon receipt of verification that the account has been charged the amount, unlock the ability to adjust the user-selectable setting;

receive, via the user interface, a value for the user-selectable setting;

generate the light operation request to include the value for the user-selectable setting; and transmit the light operation request to the first lighting device.

15. A lighting device control system for controlling one or more lighting devices, the system comprising:

a plurality of lighting devices, each of which comprises:
a communication interface that is communicatively connected to the gateway controller;
an optical radiation source, and
a fixture controller comprising a processor and memory device:

a gateway controller comprising a processor, communication interface, and memory containing programming instructions, wherein the programming instructions are configured to cause the gateway controller to:

receive, via the communication interface of the gateway controller, a signal indicating that a portable electronic device is in a proximate communication range of the gateway controller, receive, via the communication interface of the gateway controller, a light operation request from the portable electronic device, wherein the light operation request comprises one or more settings for one or more optical characteristics of light that the plurality of lighting devices may emit, determine whether the portable electronic device is authorized to initiate the light operation request, and in response to determining that the portable electronic device is authorized to initiate the light operation request, transmit commands to the fixture controllers to cause the optical radiation sources to emit light that exhibits the one or more optical characteristics.

16. The lighting device control system of claim 15, wherein:

the light operation request also comprises a time, wherein the time comprises a numeric time or a duration; and the commands to cause the optical radiation sources to emit light comprise commands to initiate or maintain the optical radiation sources in an on or requested condition during a first time period, and then switch the optical radiation sources to an off or default condition when the first time period expires.

17. The lighting device control system of claim 16, further comprising additional programming instructions configured to cause the gateway controller to:

receive, via the communication interface of the gateway controller from the portable electronic device before the first time period has expired, a request to extend the time to an extended time;

determine whether the portable electronic device is authorized to extend the first time period to the extended time; and in response to determining that the portable electronic device is authorized to extend the first time period to the extended time, cause the optical radiation sources to continue to emit light that exhibits the one or more optical characteristics through the extended time.

18. The lighting device control system of claim 15, wherein the one or more optical characteristics comprise:
   a brightness or dimming level;
   color temperature;
   color;
   $D_{uv}$;
   beam shape; or
   beam direction.

19. The lighting device control system of claim 15, wherein:
   the one or more optical characteristics comprise a scene in which settings for one or more optical characteristics of the emitted light change over time; and
   the command to cause the optical radiation sources to emit light comprise instructions to initiate or maintain the optical radiation sources in an on condition and then cause the settings for the one or more optical characteristics of the emitted light to change over time according to the scene.

20. The lighting device control system of claim 15, wherein the instructions to cause the gateway controller to determine whether the portable electronic device is authorized to initiate the light operation request comprise instructions to:
   transmit an account identifier associated with the portable electronic device and data from the light operation request to a remote server; and
   receive, from the remote server, a confirmation that the portable electronic device is authorized to submit the light operation request.

21. The lighting device control system of claim 15, wherein the instructions to cause the gateway controller to determine whether the portable electronic device is authorized to initiate the light operation request comprise instructions to determine whether the light operation request includes a valid unlock token.

* * * * *